US010890446B2

United States Patent
Bernhard et al.

(10) Patent No.: US 10,890,446 B2
(45) Date of Patent: Jan. 12, 2021

(54) SURVEYING DEVICE COMPRISING HEIGHT MEASURING SYSTEM AND METHOD FOR MEASURING A HEIGHT

(71) Applicant: LEICA GEOSYSTEMS AG, Heerbrugg (CH)

(72) Inventors: Heinz Bernhard, Berneck (CH); Jürg Hinderling, Marbach (CH); Alice Traber, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 497 days.

(21) Appl. No.: 15/640,132

(22) Filed: Jun. 30, 2017

(65) Prior Publication Data

US 2018/0003493 A1   Jan. 4, 2018

(30) Foreign Application Priority Data

Jun. 30, 2016 (EP) .................................... 16177381

(51) Int. Cl.
 *G01C 5/00* (2006.01)
 *G01C 15/10* (2006.01)
 (Continued)

(52) U.S. Cl.
 CPC .............. *G01C 5/00* (2013.01); *G01B 11/002* (2013.01); *G01C 15/002* (2013.01); *G01C 15/105* (2013.01)

(58) Field of Classification Search
 None
 See application file for complete search history.

(56) References Cited

U.S. PATENT DOCUMENTS 5,159,760 A * 11/1992 Spiegel .................... G01C 1/02
 33/227
5,886,340 A    3/1999 Suzuki et al.
(Continued)

FOREIGN PATENT DOCUMENTS

| CN | 102967298 A | 3/2013 |
| DE | 197 10 722 A1 | 10/1997 |

(Continued)

OTHER PUBLICATIONS

European Search Report dated Jan. 9, 2017 as received in Application No. 16177381.7.

*Primary Examiner* — Hovhannes Baghdasaryan

(57) ABSTRACT

A surveying device for determining the position of a target, comprising a means for orienting a target axis of the surveying device towards the target point, an angle-measuring functionality for the highly precise detection of the orientation of the target axis, and evaluation means for data storage, a height measuring system for determining a height of the surveying device above the ground by means of triangulation, wherein the height measuring system comprises at least one laser plummet for emitting a laser beam along a standing axis of the surveying device onto a ground point, and a detection unit comprising a line sensor for detecting a diffuse backscattering of the laser beam, and wherein the height measuring system for determining a height of the surveying device above the ground point is designed based on a position of the diffuse backscattering on the line sensor.

14 Claims, 6 Drawing Sheets

(51) Int. Cl.
*G01B 11/00* (2006.01)
*G01C 15/00* (2006.01)

(56) References Cited

U.S. PATENT DOCUMENTS

| | | |
|---|---|---|
| 6,072,642 A | 6/2000 | Shirai |
| 6,433,858 B1 | 8/2002 | Suzuki |
| 6,453,569 B1 | 9/2002 | Kumagai et al. |
| 6,504,602 B1 | 1/2003 | Hinderling |
| 7,583,373 B2 | 9/2009 | Schwarz |
| 7,672,049 B2 | 3/2010 | Fruhmann et al. |
| 8,345,928 B2 | 1/2013 | Svanholm |
| 8,508,719 B2 | 8/2013 | Wang et al. |
| 2010/0303300 A1* | 12/2010 | Svanholm ................ G01C 1/04 382/106 |
| 2017/0176185 A1* | 6/2017 | Maar ...................... G01C 15/06 |

FOREIGN PATENT DOCUMENTS

| | | |
|---|---|---|
| DE | 199 26 706 A1 | 12/1999 |
| DE | 199 49 580 A1 | 4/2000 |
| EP | 1 081 459 A1 | 3/2001 |
| EP | 1 662 278 A1 | 5/2006 |
| EP | 1 686 350 A1 | 8/2006 |
| EP | 2 240 741 A1 | 10/2010 |
| EP | 2 538 171 A1 | 12/2012 |
| SG | 188070 A1 | 3/2013 |

\* cited by examiner

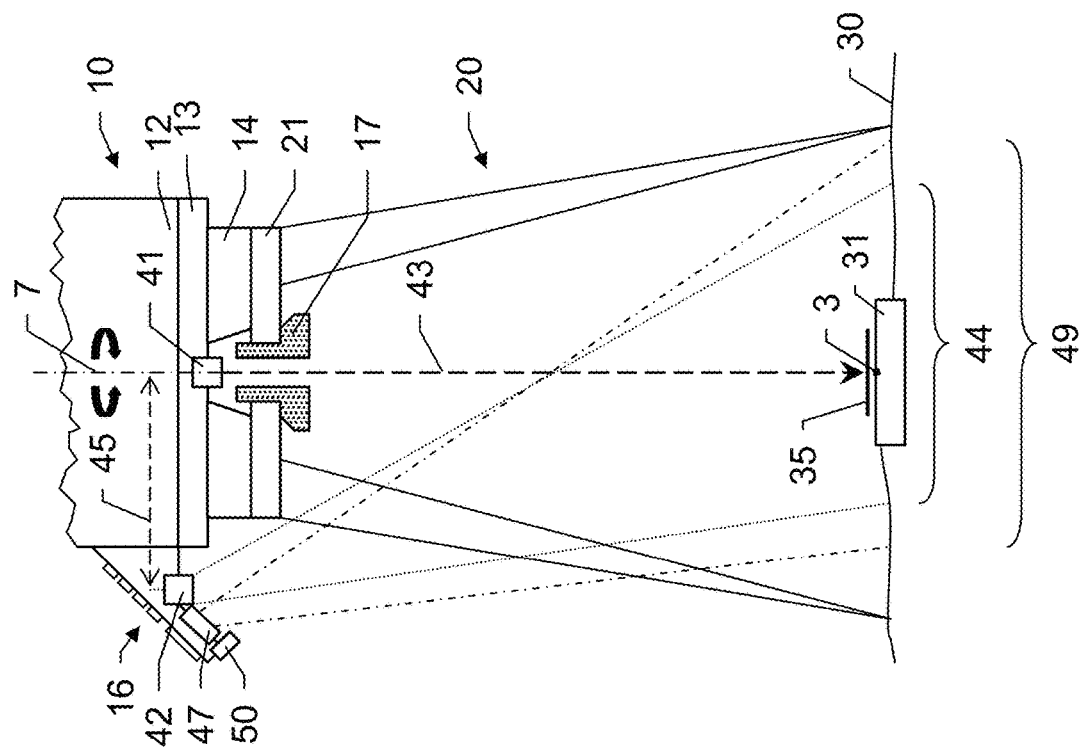
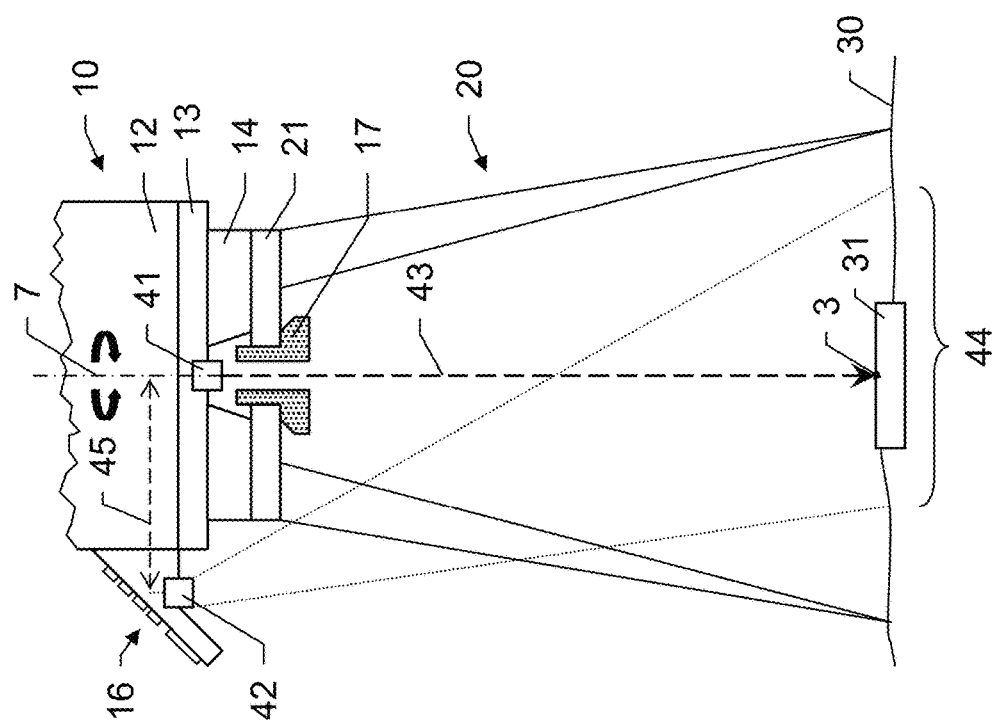

SURVEYING DEVICE COMPRISING HEIGHT MEASURING SYSTEM AND METHOD FOR MEASURING A HEIGHT

FIELD OF THE INVENTION

The present invention relates to a method for determining the height of a surveying device above the ground, and to a height measuring system for carrying out the method, and to a geodetic surveying device comprising such a system.

Numerous geodetic surveying devices for surveying target points have been known since antiquity. In this case, distance and direction or angle from a measuring device to the target point to be measured are recorded as spatial standard data and, in particular, the absolute position of the measuring device, in addition to any reference points that may be present, is detected. Typical target points in this case are church towers, leveling rods, or retroreflectors.

BACKGROUND

Generally known examples of such geodetic surveying devices are the theodolite, the tachymeter, and the total station (which is also referred to as an electronic tachymeter or computer tachymeter). A geodetic measuring device from the prior art is described, for example, in the published document EP 1 686 350 A1. Such devices comprise electrosensory angle- and distance-measuring functions which make it possible to determine a direction and a distance to a selected target. The angle and distance variables are determined in the interior reference system in this case and, optionally, must also be linked to an external reference system.

Modern total stations comprise microprocessors for the digital further processing and storage of gathered measurement data. The devices generally have a compact and integrated design, wherein coaxial distance-measuring elements as well as computing units, control units, and memory units are usually present in a device. Depending on the configuration level of the total station, a motorization of the targeting and sighting device as well as means for automatic target-seeking and tracking can also be integrated. The total station can comprise an electronic display control unit—generally a microprocessor computing unit including electronic data storage means—comprising a display and input means, e.g., a keyboard, as the human-machine interface. The measurement data gathered via electrosensory means are fed to the display control unit, and so the position of the target point can be determined, optically displayed, and stored by means of the display control unit. Total stations known from the prior art can also comprise a radio data interface for establishing a radio link to external peripheral components such as, e.g., to a portable data acquisition device which can be designed, in particular, as a data logger or a field computer.

For the purpose of sighting or targeting the target point to be measured, geodetic surveying devices of the type in question comprise a sighting telescope, such as, e.g., an optical telescope, as the sighting device. The sighting telescope is generally rotatable relative to a base of the measuring device about a vertical standing axis and about a horizontal tilting axis, and so the telescope can be oriented towards the point to be measured by means of swiveling and tilting. Modern devices can comprise, in addition to the optical viewing channel, a camera, which is integrated into the sighting telescope and, for example, is oriented coaxially or in parallel, for capturing an image, wherein the captured image can be depicted, in particular, as a live image on the display of the display control unit and/or on a display of the peripheral device used for the remote control, such as, e.g., the data logger. The lens of the sighting device can comprise a manual focus in this case—for example, an adjusting screw for changing the position of focussing lens—or can comprise an autofocus, wherein the focus position is changed, e.g., by means of servomotors. Automatic focussing devices for sighting telescopes of geodetic devices are known, e.g., from the documents DE 19710722, DE 19926706 or DE 19949580.

The optical system or the optical viewing channel of the sighting device usually contains an objective lens group, an image inversion system, a focussing lens, a reticle for generating crosshairs, and an eyepiece, which are situated, e.g., in this order proceeding from the object side. The position of the focusing lens group is adjusted depending on the object distance in such a way that a sharp object image appears on the reticle situated in the focusing plane. This can be observed through the eyepiece or, e.g., can be detected by means of a coaxially situated camera.

The design of sighting telescopes of geodetic devices of the type in question is described, by way of example, in published documents EP 1 081 459 or EP 1 662 278.

The determination of the instrument height above the ground point is one of the working steps in geodetic surveying that has not yet been automated and that cannot be subsequently checked, i.e., after the measurement has been concluded. In known methods, the height of the theodolite above the ground point is measured manually with the aid of a tape measure which is fastened on the tribrach by means of a supplementary adapter, and the measured value is manually input via the keyboard.

Different approaches for automatically determining the instrument height are known. As described in CN 102 967 298 A, a device can be provided on the telescope, by means of which the user can specifically focus on the ground point.

Documents U.S. Pat. No. 8,345,928 B2 and U.S. Pat. No. 6,453,569 B1 disclose measuring systems which centrically or eccentrically capture an image of the ground point by means of one or more cameras, rotate the cameras about the plummet, and then calculate the instrument height from the images by means of image processing. In these solutions, two-dimensional images of the ground are captured. On the basis of said images, the instrument height is determined by means of image processing and two-position measurement. Intensive image processing is required for this purpose. In order to achieve the necessary accuracy over a range of 0.5 meters to 5 meters, the camera also must be refocussed and the eccentricity of the camera must be increased. This limits the user-friendliness of the system and makes the system substantially more complicated and elaborate.

Alternatively, the device's own distance meter could measure through the device onto the ground point. This approach has a highly complex design, however, since either the path through the axis would have to be free, or the axis must be circumvented by means of optical elements. In addition, the measurement must be carried out through the tribrach and the tripod screw.

SUMMARY

One problem addressed by the present invention is therefore that of providing an improved method for measuring the height of a geodetic device above the ground.

In particular, one problem is that of providing a method that is easier for an operator to operate and has improved functionality and a lower susceptibility to error.

One further problem addressed by the present invention is that of providing a geodetic device with improved functionality for measuring a height above the ground or a distance to the ground.

One further problem addressed by the present invention is that of providing a geodetic device with an improved functionality for measuring not only a height above the ground or a distance to the ground, but also the lateral offset to the east and the north, or X and Y.

In particular, one problem is that of providing a device which has such a simple design that the functionality can be carried out without additional accessories.

One further problem is that of providing a system for measuring height, with which geodetic devices can be easily retrofitted.

At least one of these problems is solved by the geodetic surveying device according to claim 1, the height measuring system according to claim 10, the method according to claim 11, and/or the dependent claims.

One first aspect of the invention relates to a surveying device for determining the position of a target point, comprising means for orienting a target axis of the surveying device towards the target, an angle-measuring functionality for the highly precise detection of the orientation of the target axis, and evaluation means for data storage. According to the invention, the surveying device comprises a height measuring system for determining a height of the surveying device above the ground by means of triangulation. This height measuring system comprises at least one laser plummet for emitting a, in particular collimated, laser beam along a standing axis of the surveying device onto a ground point, and a detection unit comprising a line sensor for detecting a diffuse backscattering of the laser beam, and the height measuring system is designed for determining a height of the surveying device above the ground point based on a position of the diffuse backscattering on the line sensor.

In one embodiment, the surveying device is a geodetic surveying device, in particular a theodolite, a total station, or a laser scanner, comprising a base and a support, which is rotatable relative to the base about the standing axis, and a targeting device which is swivelable relative to the support about a transverse axis and comprises an objective unit defining an optical target axis.

According to one particular embodiment, the geodetic surveying device comprises means for the motorized rotation of the support and for the motorized swiveling of the targeting device, and the evaluation means are designed for controlling the orientation of the targeting device.

In one embodiment, the geodetic surveying device comprises an electronic display-control unit for controlling the surveying device and for processing, displaying, and storing measurement data, for example also for displaying the determined height. In this case, the display-control unit is situated on the support, and the detection unit is situated on the display-control unit in an optically stable manner, in particular being situated on an underside of the display-control unit.

In one embodiment of the surveying device according to the invention, the detection unit and the laser plummet are situated with respect to each other in such a way that the height measuring system meets the Scheimpflug condition. In particular, the laser plummet and the line sensor are situated in a known spatial position with respect to each other.

In yet another embodiment of the surveying device according to the invention, the detection unit comprises a linear viewing field for detecting the diffuse backscattering of the laser beam, and the height measuring system comprises a line laser unit for projecting a linear laser marking onto the ground, in particular wherein the laser plummet and the line laser unit form one unit.

In one embodiment of this surveying device, the line laser unit and the line sensor are fixedly situated with respect to each other in such a way that the linear laser marking can be at least largely projected into the viewing field, and the line sensor designed for at least partially detecting the linear laser marking.

In this case, the height measuring system is designed for deriving an intensity profile based on the detected linear laser marking on the ground and, based thereon, detecting a size, a relative position (e.g., x,y,z or E,N,h), or a type of a standardized ground target located on the ground, in particular a boundary stone or a survey marker.

In yet another embodiment of this surveying device, said surveying device has a functionality for determining a distance of an origin of a local coordinate system of the surveying device to the ground point. For this purpose, the line sensor and the line laser unit are situated on the surveying device in such a way that they can be jointly rotated through at least 180° about the standing axis. Preferably, they are rotatable through at least 360°. Within the scope of the aforementioned functionality, the line laser unit is designed for projecting a linear laser marking onto the ground, the line sensor is designed for detecting the diffuse backscatterings of the linear laser marking from a plurality of different positions with a high measuring frequency, and the height measuring system is designed for deriving a plurality of intensity profiles based on the detected diffuse backscatterings of the linear laser marking and, based on the plurality of intensity profiles, deriving a position—and, optionally, a size or type—of a standardized ground target located on the ground (e.g., a boundary stone or a survey marker) or a supplementary ground target which is offset from a user.

In particular, the line sensor and the line laser unit are situated on the surveying device in such a way that they can be jointly rotated about the standing axis through at least 270°, in particular through 360°. A rotation within the scope of the functionality can also take place, in particular, in a motorized way.

In yet another embodiment, the surveying device according to the invention comprises a camera and is designed for detecting, by means of image recognition, a target located on the ground, i.e., a standardized ground target, e.g., a boundary stone or a survey marker, or a known supplementary ground target, e.g., an offset ground target, and of assigning said target to a data record which comprises at least data regarding a spatial extension of the target and is stored in a memory. In this embodiment, the height measuring system is designed for taking the corresponding data record into account in the determination of the height.

In yet another embodiment of the surveying device according to the invention, the height measuring system is designed for carrying out a height measurement functionality, within the scope of which the laser plummet emits a laser beam along a standing axis onto the ground point, the line sensor detects the diffuse backscattering of the laser beam from a plurality of different positions, and the height of the surveying device above the ground point is determined based on the positions of the diffuse backscattering on the line sensor in the plurality of different positions. In this case, a motorized rotation of the support relative to the base about the standing axis is carried out, for example, in order for the line sensor to assume the plurality of different positions.

In one embodiment of the surveying device according to the invention, the detection unit comprises a slit diaphragm and/or a filter, in particular a polarization filter or a wavelength-dependent interference filter, for reducing unwanted reflections.

The line sensor of the surveying device according to the invention comprises, in particular, a plurality of photosensitive elements arranged in a single row, e.g., CCD or CMOS sensors or photodiodes.

Yet another aspect of the invention relates to a height measuring system for use with a surveying device for determining the position of a target point. The surveying device can be both a geodetic surveying device, e.g., a theodolite or a total station, and a laser scanner, in particular an above-described surveying device according to the invention. The height measuring system is designed for determining a height of the surveying device above the ground by means of triangulation.

According to the invention, the height measuring system comprises a laser plummet for emitting a laser beam along a standing axis of the surveying device onto a ground point, and comprises a detection unit including a line sensor for detecting a diffuse backscattering of the laser beam. The height measuring system is designed, in this case, for determining a height of the surveying device above the ground point based on a position of the diffuse backscattering on the line sensor.

Yet another aspect of the present invention relates to a method for measuring a height above the ground of a surveying device designed for determining the position of a target point by means of triangulation. The surveying device in this case can be, in particular, an above-described surveying device according to the invention. According to the invention, the method comprises the following steps of:
  positioning a line sensor on the surveying device at a known distance from a standing axis of the surveying device,
  emitting a laser beam along the standing axis onto a ground point,
  detecting a diffuse backscattering of the laser beam from the ground point by means of the line sensor, and
  determining the height based on a position of the diffuse backscattering on the line sensor, and based on the known distance.

In one embodiment, the method according to the invention additionally comprises the following steps of:
  providing data records of known ground targets, e.g., survey markers, or supplementary ground targets, wherein the data records at least comprise data regarding a spatial extension of the particular ground target or supplementary ground target,
  detecting a ground image by means of a camera, and
  detecting known ground targets and/or supplementary ground targets in the ground image by means of image recognition, wherein the corresponding data record is taken into account in the determination of the height.

In one embodiment of the method according to the invention, the detection of the diffuse backscattering of the laser beam takes place by means of the line sensor from a plurality of different positions of the line sensor, and the height is determined based on the positions of the diffuse backscattering on the line sensor in the plurality of different positions. A part of the surveying device comprising the line sensor, for example, can be rotated about the standing axis, in particular in a motorized manner and through 360°, in order for said line sensor to assume the plurality of different positions.

In yet another embodiment of the method according to the invention, in order to determine a distance or a three-dimensional offset of an origin of a local coordinate system of the surveying device from a standardized ground target located on the ground, e.g., a boundary stone or a survey marker, a part of the surveying device comprising the line sensor and a line laser unit is rotated through at least 180°, in particular through at least 270° to 360°, about the standing axis (motorized or manually by the user), wherein
  the line laser unit projects a linear laser marking onto the ground,
  the line sensor detects the diffuse backscattering of the linear laser marking with high measuring frequency from a plurality of different angular positions,
  a plurality of intensity profiles is derived based on the detected diffuse backscatterings of the linear laser marking,
  a position (and, optionally, a size or type) of the ground target is derived based on the plurality of intensity profiles, and
  a displacement vector between the coordinate system associated with the ground target and the coordinate system associated with the surveying device is derived based on the plurality of intensity profiles.

According to yet another embodiment, either coordinates of a local coordinate system of the surveying device are transformed into coordinates of an external coordinate system, or coordinates of the external coordinate system are transformed into coordinates of the local coordinate system. The origin of the local coordinate system in this case is, for example, a point of intersection of a standing axis and a transverse axis of the surveying device. In particular, the ground point has known coordinates in the external coordinate system, and coordinates of the target point are determined in the external coordinate system.

The invention also relates to a computer program product comprising program code which is stored on a machine-readable carrier, in particular on an electronic data processing unit of a surveying device according to the invention, for carrying out at least one of the following steps of the method according to the invention:
  emitting a laser beam along a standing axis of the surveying device onto a ground point by means of the laser plummet,
  detecting a diffuse backscattering of the laser beam from the ground point by means of the line sensor, and
  determining the height based on a position of the diffuse backscattering on the line sensor.

BRIEF DESCRIPTION OF THE DRAWINGS

The surveying device according to the invention, the height measuring system according to the invention, and the method according to the invention are described in greater detail, purely by way of example, in the following on the basis of specific exemplary embodiments schematically represented in the drawings, wherein further advantages of the invention will also be described. Specifically:

FIGS. 2a-b show a surveying device with two exemplary embodiments of a height measurement functionality according to the invention;

DETAILED DESCRIPTION

Figure 1B:
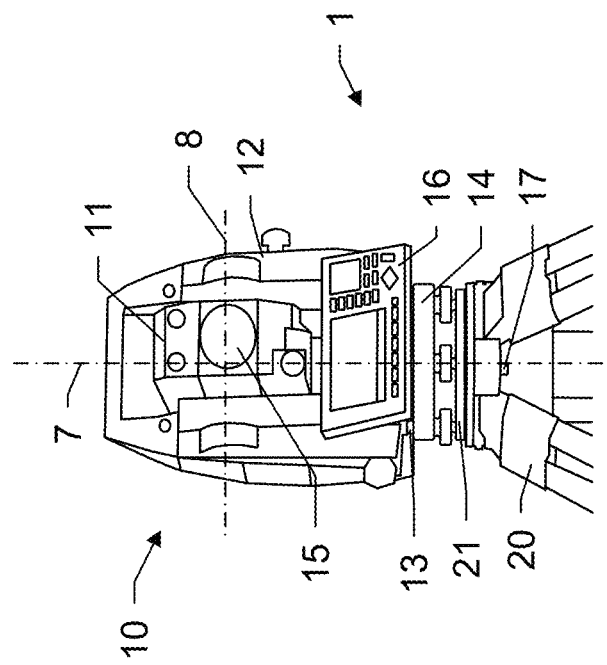
FIGS. 1a-b show a total station as an example of a geodetic surveying device according to the invention.
Figure 1A:
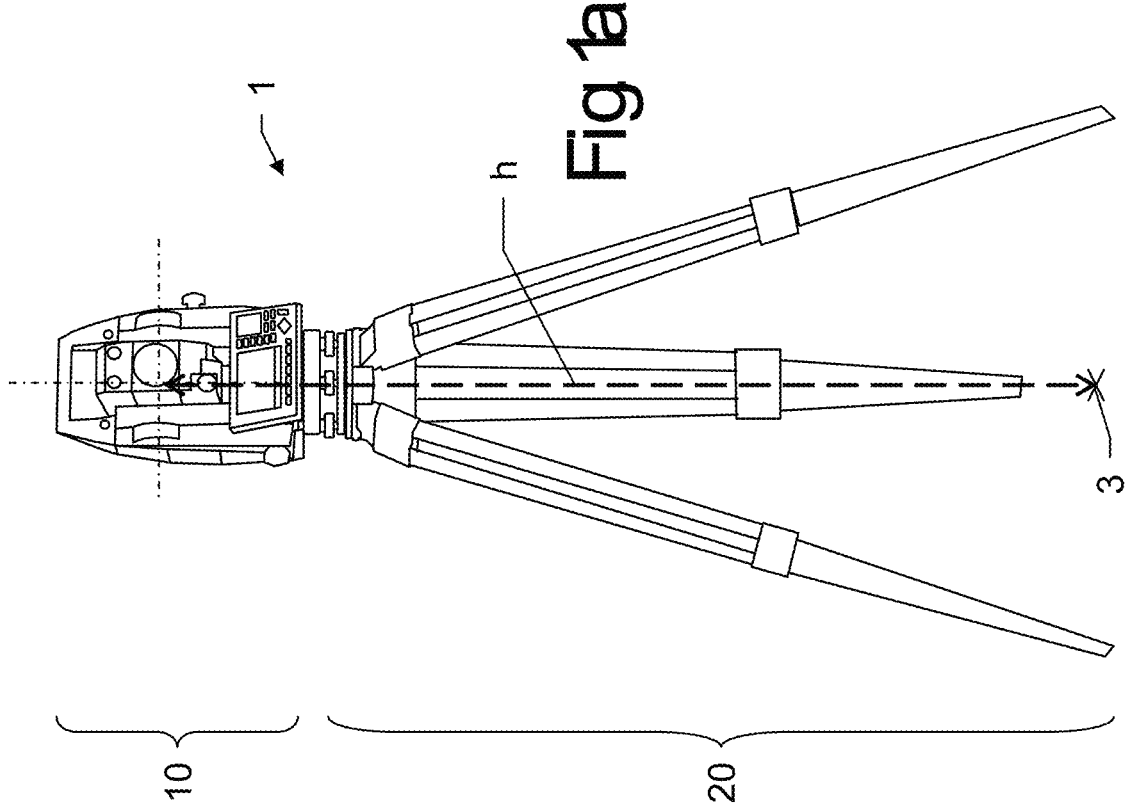

In FIGS. 1a and 1b, a total station 1 is represented as one example of a geodetic surveying device according to the invention. The main body of the total station 1, which is also referred to as the top part 10, is situated on a tripod 20 and—as shown in FIG. 1a—is situated at a height h above a ground point 3. In this case, the height h refers to the distance of the local coordinate system above the ground point to be measured. The point of intersection of the tilting axis and the standing axis of the surveying device is generally assumed to be the origin of this coordinate system. The height h above the ground is calculated proceeding from this origin point.

As represented in FIG. 1b, a base 13 of the total station 1 is directly and fixedly connected to the tripod 20. The top part 10 is rotatable relative to the base 13 about a vertical standing axis 7. In this case, the top part 10 comprises a support 12, which is formed by two columns in this exemplary design, a sighting device 11, e.g., a telescope, which is mounted between the columns so as to be rotatable about a horizontal tilting axis 8, and an electronic display-control unit 16. The display-control unit 16 can be designed, in a known way, for controlling the total station 1 and for processing, displaying, and storing measurement data.

The sighting device 11 is situated on the support 12 so as to be rotatable about a horizontal tilting axis 8 and, therefore, can be swiveled or tilted horizontally and vertically relative to the base 13 for the purpose of orienting towards a target object. Motors (not shown here) are present for carrying out necessary swiveling and tilting movements in order to orient the sighting device 11. The sighting device 11 can be designed as a combination sighting device assembly, wherein an objective, a focusing lens, a coaxial camera sensor, the eyepiece 15, and a graphics processor can be integrated in one shared sighting device housing. By means of the sighting device 11, the target object can be targeted and the distance from the total station 1 to the target object can be detected via electrosensory means. In addition, means are provided for the electrosensory detection of the angular orientation of the top part 10 relative to the base 13 and of the sighting device 11 relative to the support 12. These measurement data detected via electrosensory means are fed to the display-control unit 16 and are processed by said unit, and so the position of the target point relative to the total station 1 can be determined, optically displayed, and stored by means of the display-control unit 16.

The surveying device 1 typically stands upright on a three-legged tripod 20 and is fixed on the tripod plate 21 by means of a tribrach 14 and a tripod screw 17, is centered with respect to the ground point 3, and is secured in place by means of the screw.

FIG. 2a shows a geodetic surveying device 1 having an exemplary embodiment of a height measuring system for carrying out a height measurement functionality. The surveying device 1 is set up over a ground target 31 (e.g., a survey marker as part of a boundary stone) which has been placed into the ground 30.

A laser plummet 41 provided in the surveying device 1 projects a laser dot—as an extension of the rotational axis 7—through the hollow tripod screw 17 onto the ground (ground point 3). A detection unit 42 of the surveying device is designed for detecting the laser dot in a viewing field 44.

Figure 4:
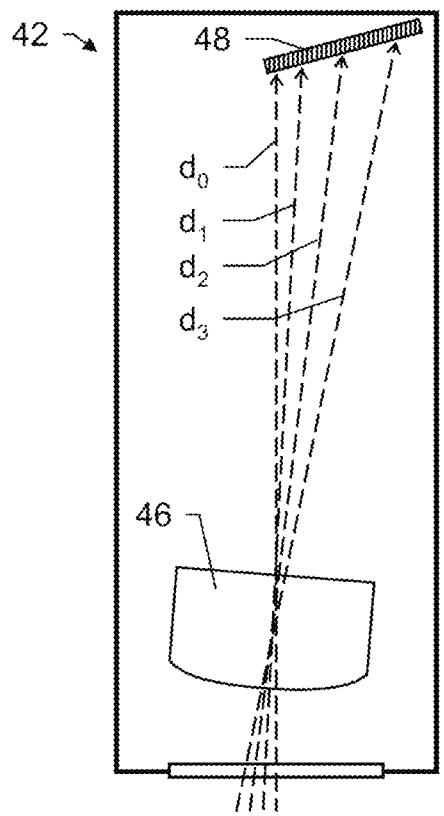
FIG. 4 shows a detection unit of the height measuring system.

The detection unit 42 comprises a lens and a line sensor (see FIG. 4). The laser dot is sharply imaged onto the line sensor via the lens which, in the surveying device 1 shown, has been mounted eccentrically next to the display-control unit 16. In particular, the detection unit 42 is designed in such a way that the Scheimpflug condition is fulfilled.

In this case, the point of the line sensor at which the laser dot is formed is dependent on the height of the surveying device 1 above the ground 30. Since the basic length 45 between the laser plummet 41 and the receiver 42 is known, the height h above the ground point 3 can be calculated by means of triangulation.

The height h can be calculated on the basis of the pixel position via the calibration curve which is determined one time, when the device is assembled in the plant.

The detection unit 42 must be able to see the ground point 3 past the base 13, the tribrach (not shown here), and the tripod plate 21. In this way, under the condition that the detection unit 42 does not protrude from the device further than the keyboard, and that the beam path from the detection unit 42 is not tangent to the tripod plate 21, a minimum measurement height of approximately half a meter results.

The detection unit 42 can be mounted, for example, directly on the support, in the back wall of the display-control unit 16, or in the side cover.

Since the detection unit 42 is an absolute distance meter which should be usable across a large temperature range, it is situated in an optically stable manner at a known distance 45 from the laser plummet 41.

FIG. 2b shows the surveying device 1 from FIG. 2a, wherein the height measuring system additionally comprises a line laser 47 and a ground camera 50. The line laser is designed for projecting a linear ground marking 49 onto the ground 30 under the surveying device 1, which marking can be detected by the line sensor of the detection unit 42 and/or by the ground camera 50. A supplementary ground target 35 is also shown, which is in the form of a disk which has been placed over the ground point 3 (see the explanations for FIGS. 6a-d).

Figure 3:
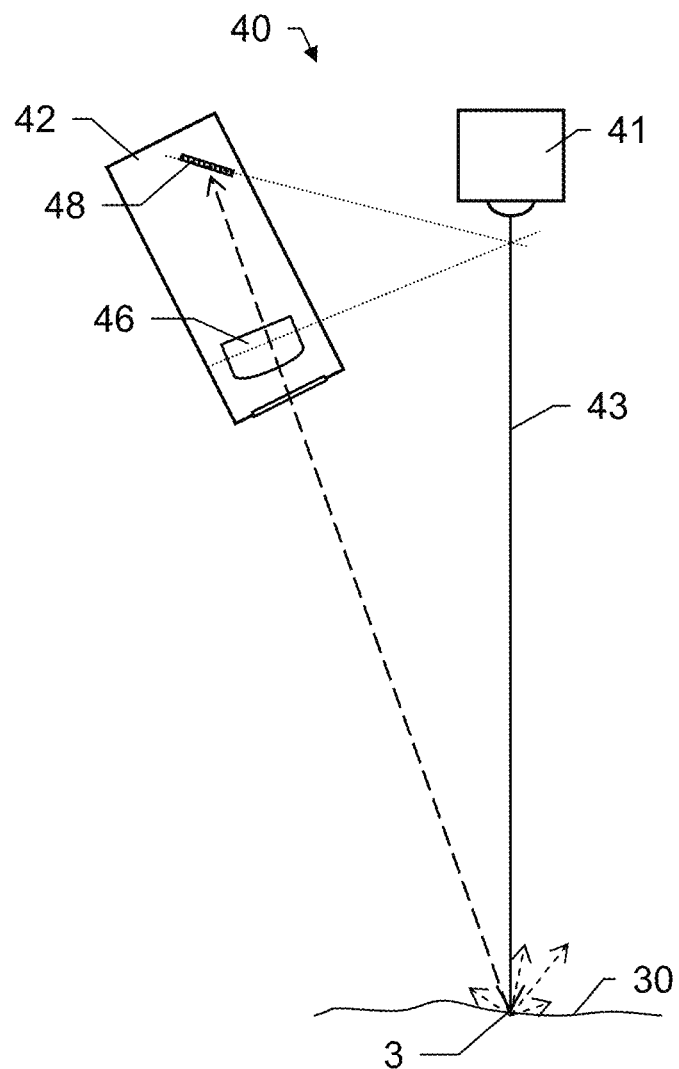
FIG. 3 shows a height measuring system according to the invention.

FIG. 3 schematically shows the design of a height measuring system 40 for use in a geodetic surveying device (not shown here) for measuring its height above the ground 30. The laser plummet 41 and the detection unit 42 are situated in a known, fixed, spatial relationship with respect to each other. A lens 46 and a line sensor 48 are situated in the detection unit. The line sensor 48 is designed, for example, as a linear CCD sensor (CCD=charge-coupled device) and comprises a plurality of photosensitive elements arranged in a single row. In particular, an image having a single row of pixels can be captured in this way.

The represented height measuring system 40 meets the Scheimpflug condition, i.e., the ground point 3 is always imaged on the line sensor 48 with the maximum sharpness.

The laser plummet 41 emits a laser beam 43 (or a light beam) onto the ground point 3. Diffuse backscatterings of the laser beam 43 reach the detection unit 42 through an opening and, there, are directed through the lens 46 onto the line sensor 48. On the basis of the illuminated pixel or pixels, a height of a base above the ground point 3 can be determined by means of triangulation.

FIG. 4 shows one exemplary design of a detection unit 42. Said detection unit comprises a line sensor 48 and a receiver lens 46 located ahead thereof. Depicted therein are diffuse backscatterings of the laser signal 43 of the laser plummet from the ground point 3, which correspond to four different distances to the ground point 3. In this case, the backscattering $d_0$ impinging on the line sensor 48 on the far left corresponds to an infinitely great distance. The backscattering $d_1$ immediately to the right thereof corresponds to a distance of five meters, the next backscattering $d_2$ corresponds to a distance of one meter, and the backscattering $d_3$ on the far right corresponds to a distance of half a meter.

The detection unit 42 is designed, together with the laser plummet (not shown here), according to the known basic principle of a triangulation distance meter. The line sensor 48 is preferably oriented with respect to the laser plummet such that the Scheimpflug condition is met, i.e., the diffuse backscatterings are sharply imaged on the line sensor 48 independently of their distance.

The diameter of the receiver lens 46 is preferably approximately three- to five-times larger than the image to be measured, in order to minimize errors due to speckles.

The line sensor 48 has great advantages over an area scan camera due to its simplicity, the high scanning rate, and the favorable price. In this way, images can be captured in the kilohertz range and, due to the small amount of data, can be processed in real time and using the simplest electronics hardware.

The Scheimpflug condition is met in this case when the object plane, the image plane, and the main plane of the lens intersect in a shared line or straight line. This means, if the main plane of the lens, the image plane, and the object plane, which includes the orientation axis, intersect in a shared intersection line, the desired sharp imaging of the objects located in the object plane can be ensured during the measurement, independently of the distance, without the need to make any adjustments.

Since it should be possible to preferably measure distances between half a meter and five meters, it is possible in the case of a Scheimpflug arrangement to work with a fixed focus system, which substantially simplifies the system, and a sharp image is imaged at any distance, i.e., the signal strength is maximized.

Since triangulation is an absolute measuring method, a single measurement is generally sufficient. The receiver cannot see the laser dot at certain ground points due to the shadows cast by the tripod legs in certain angular segments or when the surveyor mounts the tribrach in such a way that it extends beyond the tripod plate. In order to minimize the shadows that may therefore be cast by the tripod plate or the tripod legs, and to achieve a good standard deviation, i.e., to obtain as many measurement points as possible, the surveyor can be preferably prompted in this case to carry out a 360° rotation of the device. Alternatively to a manual rotation, this rotation can also take place in a motorized and automatic manner.

By means of this rotation of the device about its own axis which corresponds to the laser plummet, several independent measurements are recorded, which are referenced with the angle sensor. Points that are completely or partially shaded can be discarded. When the angle measuring device signals that the 360° rotation has been completed and a sufficient number of independent individual measurements are present, an average of all points is calculated and, on the basis thereof, the height is calculated. The standard deviation of the individual measurements can be displayed to the surveyor and provides a clear indication of the quality of the measured value which usually also describes the quality of the ground point (roughness, geometry, topology, plants).

When the detection unit 42—as shown in FIGS. 2a-b—is situated in the underside of the display-control unit 16, any theodolite, in principle, can be retrofitted, with consideration for the electronic interfaces.

Figure 5A:
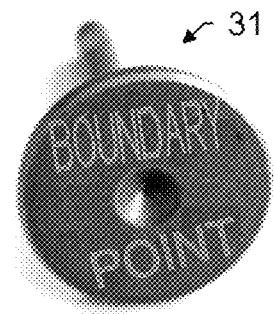
FIGS. 5a-b show an exemplary survey marker.
Figure 5B:
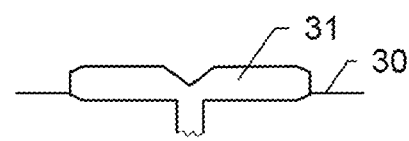

An exemplary ground target in the form of a survey marker 31 ("boundary point") is shown in FIG. 5a. FIG. 5b shows a cross-section of the survey marker 31 which has been placed into the ground 30. The appearance of the survey markers differs from country to country and has been partially standardized. As is the case with the survey marker shown here, many such points have a V-shaped indentation precisely in the center, i.e., the measurement point, which is used as guidance for the tip of a range pole. When the theodolite is oriented precisely over the survey marker 31, the laser plummet therefore aims precisely into the cone.

Figure 6:
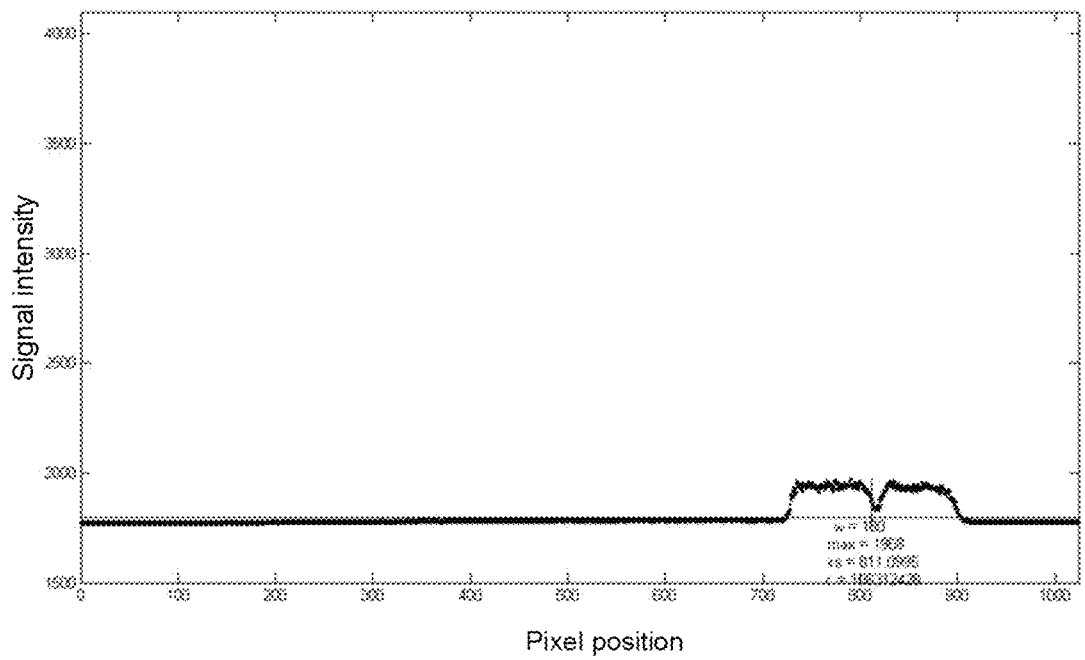
FIG. 6 shows an intensity profile of the survey marker from FIGS. 5a and 5b.
Figure 7A:
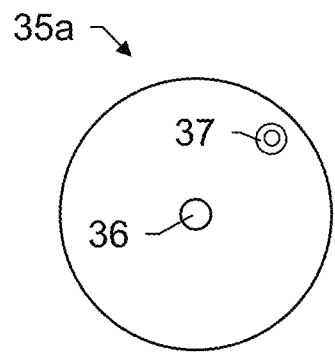
FIGS. 7a-d show two exemplary embodiments of an offset ground target.
Figure 7B:
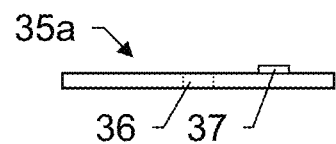
Figure 7C:
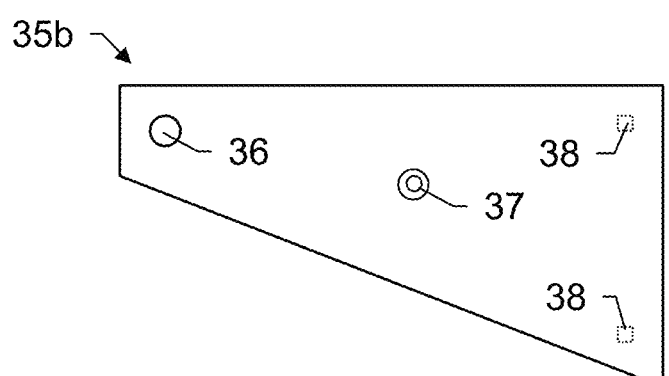
Figure 7D:
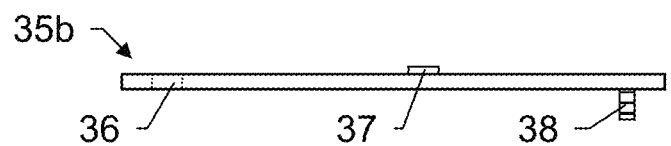

In this case, it is helpful when the type of survey marker on which the measurement is to be carried out is known. A detection of the type of survey marker can take place, for example, by means of a downwardly oriented camera (as shown in FIG. 2b) which recognizes, by means of image recognition, country-specific survey markers which were previously stored in a memory. Simultaneously, the ground point is illuminated via an external illuminating line laser (as shown in FIG. 2b) or by a line which is generated, for example, by a cylindrical lens or a DOE element in the laser plummet, and so a brightness or intensity profile is generated via the line receiver, on the basis of which the geometry of the survey marker 31 can be deduced. Such an intensity profile is shown in FIG. 6.

The surface of the survey markers generally has a three-dimensional extension. As in the example selected here, this can be a conical indentation in the center, but also, e.g., a crown. The measured height can therefore deviate in the single-digit millimeter range, depending on the point at which the survey marker 31 is measured.

The ground point is illuminated by means of a linear illuminator (e.g., a line laser having the same wavelength as the laser plummet) or a line generated by a DOE element in the laser plummet. The linear illuminating laser is also adjusted with respect to the triangulation receiver.

The line sensor detects the line on the ground. The height information is on the pixel on which the image of the laser plummet (corresponding to the calibration curve) is sharply imaged. The image becomes slightly less sharp, according to clear rules, to the left and the right on the sensor. Since the survey markers have very small diameters (a few cm), this blurriness can be disregarded.

Substantially less light is returned from the lateral edges and the conical indentation of the survey marker than from the straight surface. The brightness or the intensity of the diffuse backscattering therefore represents the spatial geometry of the survey marker on the sensor.

By means of a rotation through 360°, a sufficient number of images is recorded in order to generate a spatial brightness image. The captured image is then compared to the image from the camera and with the image in a database. Since the point of impingement of the laser plummet on the survey marker is now known, the measured value can appropriately corrected.

The measurement can take place as follows, for example: The tripod is set up so as to be centered over the ground point as well as possible, and the tripod plate is roughly leveled by observation. The theodolite is loosely screwed onto the tripod plate by means of the tribrach, is switched on, and is leveled by means of a bull's eye bubble. The theodolite which has been leveled in this way is slid on the tripod plate and is oriented with respect to the ground point by means of the laser plummet. The leveling is checked and, if necessary, the orientation is iteratively readjusted until the leveling and the orientation over the ground point are correct. Next, the instrument is secured in place by means of the screw.

The measurement is triggered, and the theodolite is simultaneously rotated through 360°. One rotation by hand lasts for approximately two seconds; therefore, at 1 kHz, approximately 1000 usable measurements are recorded (e.g., 500 by the laser plummet and 500 by the linear illuminator). An optimal automatic rotation can be carried out at a corresponding speed.

The ground camera takes a few pictures, compares the ground target (e.g., survey marker) with those in a stored list and forwards the geometry data of the known ground target to the algorithm. The linear illuminating laser (or the line generated by a DOE element in the laser plummet) illuminates the ground target. The receiver captures the intensity or brightness profile of the ground target. The laser plummet illuminates the ground target. The receiver captures the stationary image of the laser plummet dot. Outlier reflections are partially corrected in real time. When all measurements have been completed, the measured height is calculated using the profile, and the instrument height, together with the associated standard deviation, appears on the display.

Since survey markers 31 are usually made from metal and, therefore, are usually shiny, at least in the new state, the laser plummet light can be reflected away, and so it mostly does not strike the receiver. Only the non-polarized residual signal, which diffusely radiates from the survey marker and is detected by the receiver, carries the correct position information. Most of the light that impinges on the receiver originates from interfering reflections, however. These must be detected by the software and computationally removed.

Further measures for reducing errors caused by shiny targets are the following, in particular:

Optionally, the shiny ground point can be coated with a dull paint (e.g., a spray).

Optionally, the reflections can also be filtered out by means of the evaluation. Given that a portion of up to 90% of the laser image is reflected away via specular reflection at the glancing angle of the survey marker, only the Lambert component containing the correct position information arrives at the line sensor. A portion of the specularly reflected light impinges on the line sensor and thereby corrupts the measurement. Since the laser plummet rotates along with the receiver, the specular reflections change very rapidly. The Lambert component, however, remains fixed on the line sensor on the same pixels. The high-frequency component can now be filtered out of the many images, and so only the low-frequency component counts. The point that remains fixed throughout the entire 360° is the correct point.

Likewise, depending on image errors, different evaluation methods can be applied onto the pixel images (e.g., center of gravity methods) and compared with each other.

Optionally, a polarization filter can be situated in front of the receiver. Since the laser is polarized, reflections that were generated by simple specular reflection can therefore be filtered out. The polarization filter must be oriented towards the laser.

An optional interference filter helps to reduce the ambient light (e.g., sunlight).

An optional slit diaphragm in front of the receiver reduces spurious light on the line sensor.

Optionally, a comparison of a light image and a dark image can take place by switching the laser light source on and off in alternation. For this purpose, the laser plummet or the linear illuminating laser must be synchronized with the receiver. The reflections produced by the laser plummet via the survey marker cannot be reduced in this way, but all reflections caused by ambient light can.

During a rotation of the instrument about the standing axis, the difference images can be captured at a rate of, for example, 1 kHz, wherein the laser plummet and the line laser are synchronized in alternation.

Alternatively, the laser power can be increased by means of short pulses, so that the Lambert component on the metallically shining survey marker is increased (the more specularly reflective the surface, the lower the diffuse backscattering). The reflections are therefore also stronger, of course. The same applies for a line which is generated by a DOE element in the laser plummet.

FIGS. 6a-d show two exemplary supplementary ground targets 35a,b for use with one embodiment of the detection unit according to the invention.

Since ground targets such as a survey marker can have different shapes, colors, and surface conditions, in one embodiment, a supplementary ground target 35a,b is placed over the survey marker to be measured (see FIG. 3b). This can be, for example, a thin plate having a defined thickness and a defined surface condition. The known thickness of the plate is then added to the result of the measurement. When such a supplementary ground target 35a,b is utilized, it can be assumed that the receiver measures a point which behaves essentially like a Lambertian emitter. Specular reflections and surface defects of the actual survey marker are therefore eliminated. If the supplementary ground target 35a,b would happen to be soiled (dust, water droplets, etc.), the user recognizes this immediately by way of the increased standard deviation.

The supplementary ground target 35a,b is placed horizontally on the ground point. When the ground point is spherical, a stabilization of the supplementary ground target for the duration of the measuring time can be achieved, for example, by means of an adhesive surface on its underside.

The supplementary ground target should be designed to be large enough that there are no reflections or lost images in the direct vicinity of the laser dot (or the viewing field 44 of the detection unit). There is no way to prevent, e.g., the sun from shining on a highly reflective point which, in turn, impinges on the receiver. Such measuring errors can be discovered and discarded by performing measurements from different directions. In this case, the line array has a great advantage over a PSD: In the case of a line, it is possible to work with a cutout in which reflections on the edge are not evaluated.

Further possibilities for optimization for the purpose of minimizing specular reflections or reflections (e.g., around the ground point or on the tripod), which reduce the accuracy of the point evaluation on the line sensor, include, inter alia, a slit diaphragm in front of the receiver in order to reduce "spurious" light on the line sensor, an interference filter, in order to reduce the ambient light, or a light image-dark image comparison, for the purpose of which the laser must be synchronized with the receiver.

In one first exemplary embodiment, which is shown from the top in FIG. 6a and in its side view in FIG. 6b, the supplementary ground target is an offset ground target 35a in the form of a round disk having a diameter of approximately 25 cm and comprising a spirit level vial 37. The offset ground target 35a is placed on the ground point so as to be balanced and horizontal and is mechanically centered with respect to the ground point with the aid of the central bore 36.

One further exemplary embodiment is a quadrangular offset ground target 35b which lies on one side of the ground point via a laterally offset bore hole 36 and, optionally, can be leveled by means of two height-adjustable feet 38.

The supplementary ground target is advantageously optimized for use with a certain survey marker. It can therefore be provided for each country as a special offset ground target 35a,b for the typical ground points. This offset ground target must be stable for as long as it takes to orient the surveying instrument (since it is between the tripod legs, it is protected against being touched).

An exemplary measurement procedure in which a supplementary ground target is utilized is described in the following:

The tripod is set up so as to be centered over the ground point as well as possible, and the tripod plate is roughly leveled by observation. The theodolite is loosely screwed onto the tripod plate by means of the tribrach, is switched on, and is leveled by means of a bull's eye bubble. The theodolite which has been leveled in this way is slid on the tripod plate and is oriented with respect to the ground point by means of the laser plummet. The leveling is checked and, if necessary, the orientation is iteratively readjusted until the leveling and the orientation over the ground point are correct. Next, the instrument is secured in place by means of the screw.

A supplementary ground target is placed horizontally on the ground point. The measurement is triggered, and the theodolite is simultaneously rotated through up to 360°. The instrument height, along with the associated standard deviation, then appears on the display.

The measurement procedure is essentially the same in the case of a measurement carried out without a supplementary ground target, i.e., on the ground itself. The standard deviation of the individual measurements automatically increases as a result of the greater diffusion due to the natural ground condition. As a result of the diffusion, the user obtains a direct measure of the quality of the ground point and the quality of the measurement (roughness, geometry, topology, plants, operator error).

An offset ground target 35a,b can also be advantageously utilized for an offset measurement, i.e., for an automatic determination of the centering of the theodolite over the ground point.

During the 360° rotation of the theodolite, the height is determined via the laser dot and the line receiver by means of triangulation. At the same time, the offset ground target is illuminated by means of the linear illuminating laser, or a line generated by a DOE element in the laser plummet. The illuminated line rotates over the offset ground target and passes over the centering opening over the ground point twice. The position of the two edges can be detected on the line sensor by way of the brightness difference of the edges of the centering bore hole in the offset ground target. The image of the laser plummet is therefore always visible on the line array and the the edges of the centering bore hole of the offset ground target are visible twice.

During the evaluation, it must therefore be possible to distinguish between a bright laser dot and a brightness or intensity profile of the bore hole. One evaluation or the other can be carried out and/or checked by switching the linear illuminating laser or the laser plummet on and off.

For recurrent control measurements based on known ground points (e.g., in the case of tunnels, roads, etc.), it is desirable for the set-up and orientation process to be automated and simplified. The ground camera detects the ground point and compares it with stored data in a stored list. The ground camera is also helpful with respect to the documentation.

Figure 8A:
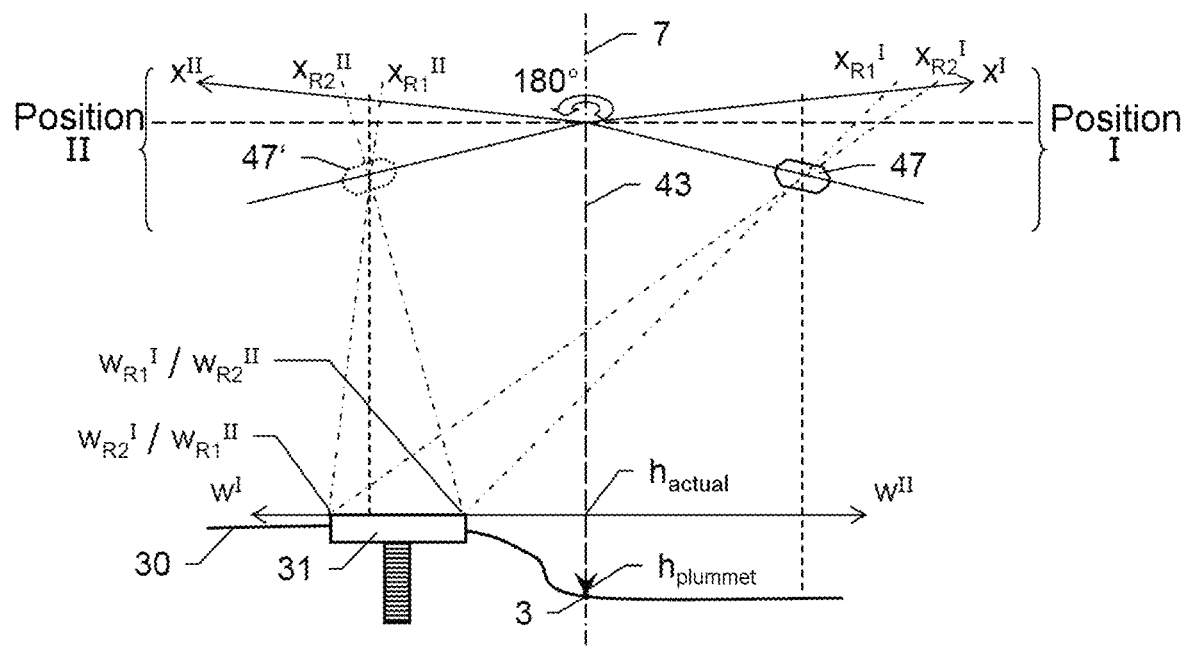
FIGS. 8a-b show a determination of a distance between the standing axis of the surveying device and a survey marker.
Figure 8B:
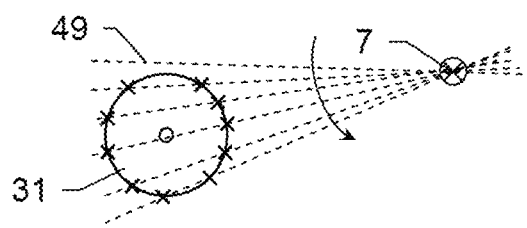

One exemplary method is illustrated in FIGS. 8a and 8b, by means of which an offset of the standing axis 7 of the surveying device from a geodetic point 31 can also be determined without a supplementary ground target.

Provided there is a geodetic point 31 which is defined and can be identified by means of an intensity scan or a camera, the system according to the invention can determine the offset of the standing axis 7 of the surveying device from the geodetic point 31 by means of triangulation (this means, essentially as described above with respect to working with the supplementary ground target). The actual instrument height above the geodetic point 31 ($h_{wahr}$) and the measured height over the actually targeted ground point 3 ($h_{Lot}$) do not need to be identical, since both are measured by the receiver.

In principle, the method can also be carried out using a single-position measurement, although in terms of accuracy it is decisive that a measurement be carried out with a high measuring frequency and at least one 180° rotation, preferably with a 360° rotation. As a result, it is guaranteed that a measurement is always carried out in two positions, provided the set-up deviation is not greater than a few geodetic-point diameters, which also approximately corresponds to the typical set-up accuracy. If the set-up error is greater, an optimal two-position measurement cannot always be guaranteed, due to the shadows cast by the tripod legs, whereby the measurement accuracy can be reduced.

In the case of tunnel or road construction, in which several repetitive measurements must be carried out using the same ground control point, this can substantially increase efficiency during set-up.

FIG. 8a schematically shows a rotation of the surveying device (or parts thereof) about the standing axis 7. The laser plummet 41 emits a laser beam 43 onto the ground point 3.

During the rotation, different positions are assumed by a line laser 47 of the device. In this case, the two positions "Position I" and "Position II", which are positioned opposite one another at an 180° angle, are shown.

In each position, the line laser 47 projects a linear ground marker 49 onto the ground 30 under the surveying device. Located on the ground 30, offset from the standing axis 7 and the ground point 3, is an identifiable geodetic point 31 which is impinged upon by the linear ground marking 49 in certain positions of the line laser 47, inter alia, in the two positions I and II shown here.

A recording unit (not shown here), e.g., a line sensor or a camera, records the backscattering of the projected ground marking in each position ($x^I$, $x^{II}$). Based on the detected backscattering, an intensity profile (cf. FIG. 6) is created for each position. Based on the plurality of intensity profiles, the geodetic point 31 or its position can be unambiguously identified, in particular by means of characteristic backscattering at the points of intersection of the linear ground markings with the edges of the geodetic point 31 ($w_{R1}^I$, $w_{R2}^I$, $w_{R1}^{II}$, $w_{R2}^{II}$).

FIG. 8b shows the geodetic point 31 from above with a plurality of line markings 49 projected during one rotation about the standing axis 7. The points of intersection of these line markings 49 with the edges of the geodetic point 31 (each indicated by a cross in FIG. 8b) are evident in an intensity profile of each of the detected line markings 49.

The direction and distance of the standing axis 7 with respect to the geodetic point 31 can be determined by means of the plurality of intensity profiles.

It is understood that these figures shown merely schematically represent possible exemplary embodiments. The different approaches can be combined with each other and with methods and devices from the prior art.

What is claimed is:

1. A surveying device for determining the position of a target point, the surveying device comprising:
   a means for orienting a target axis of the surveying device towards the target point;
   an angle-measuring functionality for the highly precise detection of the orientation of the target axis;
   an evaluation means for data storage; and
   a height measuring system for determining a height of the surveying device above the ground by means of triangulation, wherein the height measuring system comprises:
      a laser plummet for emitting a laser beam along a standing axis of the surveying device onto a ground point, and
      a detection unit comprising a line sensor for detecting a diffuse backscattering of the laser beam,
   wherein the height measuring system is designed for determining a height of the surveying device above the ground point based on a position of the diffuse backscattering on the line sensor, and
   wherein the height measuring system comprises a line laser unit for projecting a linear laser marking onto the ground, and
   the detection unit comprises a linear viewing field for detecting the diffuse backscattering of the laser beam, and the line sensor is designed for at least partially detecting the linear laser marking,
   wherein the height measuring system is designed for deriving an intensity profile based on the detected linear laser marking on the ground and, based thereon, detecting a size, a relative position, or a type of a standardized ground target located on the ground.

2. The surveying device according to claim 1, wherein the surveying device is a geodetic surveying device, a theodolite, a total station, or a laser scanner, comprising:
   a base;
   a support which is rotatable relative to the base about a standing axis; and
   a targeting device which is swivels relative to the support about a transverse axis and comprises an objective unit defining an optical target axis.

3. The surveying device according to claim 1, wherein the detection unit and the laser plummet are situated with respect to each other in such a way that the height measuring system meets the Scheimpflug condition.

4. The surveying device according to claim 1, wherein the line sensor and the line laser unit are situated on the surveying device in such a way that they can be jointly rotated through at least 1800 about the standing axis, wherein within the scope of a functionality for determining a distance or a three-dimensional offset of an origin of a local coordinate system of the surveying device from a standardized ground target located on the ground, and wherein: the line laser unit is designed for projecting a linear laser marking onto the ground, the line sensor is designed for detecting the diffuse backscattering of the linear laser marking with a high measuring frequency from a plurality of different positions, and the height measuring system is designed for deriving a plurality of intensity profiles based on the detected diffuse backscatterings of the linear laser marking and of deriving a position of the ground target based on the plurality of intensity profiles.

5. A surveying device according to claim 1, further comprising: a camera which is designed for detecting:
   a standardized ground target by means of image recognition, or
   a known supplementary ground target located on the ground by means of image recognition,
   and which is assigning the detection to a data record stored in a memory, which includes at least data regarding the spatial extension of the standardized ground target or the supplementary ground target, and wherein the height measuring system is designed for taking the corresponding data record into account in the determination of the height.

6. A surveying device according to claim 1, further comprising an electronic display-control unit for controlling the surveying device and for processing, displaying, and storing measurement data, wherein the display-control unit is situated on the support, and the detection unit is situated in an optically stable manner on the display-control unit.

7. The surveying device according to claim 1, wherein the height measuring system is designed for carrying out a height measurement functionality, wherein:
   the laser plummet emits a laser beam along the standing axis onto the ground point, and
   the line sensor detects the diffuse backscattering of the laser beam from a plurality of different positions, and
   the height of the surveying device above the ground is determined based on the positions of the diffuse backscattering on the line sensor in the plurality of different positions.

8. The surveying device according to claim 1, wherein:
   the detection unit comprises a slit diaphragm or a filter; or
   the line sensor comprises a plurality of photosensitive elements arranged in a single row.

9. A method for measuring a height of a surveying device designed for determining the position of a target point above the ground by means of triangulation, the method comprising:
   positioning a line sensor on the surveying device at a known distance from a standing axis of the surveying device;
   emitting a laser beam along the standing axis onto a ground point;
   detecting a diffuse backscattering of the laser beam from the ground point by means of a line sensor; and
   determining the height based on a position of the diffuse backscattering on the line sensor and based on the known distance, wherein the method further comprises projection of a linear laser marking onto the ground, with a height measuring system of a surveying device comprising a line laser unit, wherein the diffuse backscattering of the laser beam is detected by a detection unit of the height measuring system, and wherein the line sensor is designed for at least partially detecting the linear laser marking, whereby the height measuring system is designed for deriving an intensity profile based on the detected linear laser marking on the ground and, based thereon, detecting a size, a relative position, or a type of a standardized ground target located on the ground.

10. The method according to claim 9, further comprising:
   providing data records of known ground targets or supplementary ground targets, wherein the data records at least comprise data regarding a spatial extension of the particular ground target or supplementary ground target;

detecting a ground image by means of a camera; and detecting known ground targets or supplementary ground targets in the ground image by means of image recognition, wherein the corresponding data record is taken into account in the determination of the height.

11. The method according to claim 9, wherein the detection of the diffuse backscattering of the laser beam takes place by the line sensor from a plurality of different positions of the line sensor, and the height is determined based on the positions of the diffuse backscattering on the line sensor in the plurality of different positions.

12. The method according to claim 9, wherein a part of the surveying device comprising the line sensor and a line laser unit is rotated through at least 180° about the standing axis in order to determine a distance of an origin of a local coordinate system of the surveying device to a standardized ground target located on the ground, wherein:

the line laser unit projects a linear laser marking onto the ground, the line sensor detects the diffuse backscattering of the linear laser marking with high measuring frequency from a plurality of different positions, a plurality of intensity profiles is derived based on the detected diffuse backscatterings of the linear laser marking, a position of the ground target is derived based on the plurality of intensity profiles, and a displacement vector between the coordinate system associated with the ground target and the coordinate system associated with the surveying device is derived based on the plurality of intensity profiles.

13. The method according to claim 9, wherein a plurality of coordinates of a local coordinate system of the surveying device are transformed into a plurality of coordinates of an external coordinate system, or the plurality of coordinates of the external coordinate system are transformed into the plurality of coordinates of the local coordinate system.

14. The surveying device according to according to claim 1, wherein the line laser unit and the line sensor are fixedly situated with respect to each other in such a way, that the linear laser marking can be at least largely projected into the viewing field.

* * * * *